United States Patent
Hou et al.

(10) Patent No.: US 12,405,208 B2
(45) Date of Patent: Sep. 2, 2025

(54) METHOD FOR SCREENING THE OPTIMAL ZINC ION CONCENTRATION OF A PRIMARY LOOP DURING A THERMAL STATE FUNCTION TEST OF A NUCLEAR POWER PLANT

(71) Applicant: Sanmen Nuclear Power Co., Ltd., Taizhou (CN)

(72) Inventors: Tao Hou, Taizhou (CN); Xuechao Nie, Taizhou (CN); Shunlong Yang, Taizhou (CN); Lei Jiang, Taizhou (CN); Xianbo Meng, Taizhou (CN); Xudong Wu, Taizhou (CN); Jianhua Cheng, Taizhou (CN); Yinqiang Chen, Taizhou (CN)

(73) Assignee: SANMEN NUCLEAR POWER CO., LTD., Taizhou (CN)

( * ) Notice: Subject to any disclaimer, the term of this patent is extended or adjusted under 35 U.S.C. 154(b) by 167 days.

(21) Appl. No.: 18/510,552

(22) Filed: Nov. 15, 2023

(65) Prior Publication Data

US 2024/0183774 A1    Jun. 6, 2024

Related U.S. Application Data (63) Continuation of application No. PCT/CN2023/077865, filed on Feb. 23, 2023.

(30) Foreign Application Priority Data

Sep. 2, 2022    (CN) .......................... 202211068570.5

(51) Int. Cl.
*G01N 17/02*    (2006.01)
*G01N 1/28*    (2006.01)
(Continued)

(52) U.S. Cl.
CPC ............. *G01N 17/02* (2013.01); *G01N 1/286* (2013.01); *G01N 1/32* (2013.01); *G01N 1/34* (2013.01);
(Continued)

(58) Field of Classification Search
CPC .......... G01N 17/02; G01N 1/286; G01N 1/32; G01N 1/34; G01N 17/002; G01N 23/2251;
(Continued)

(56) References Cited

U.S. PATENT DOCUMENTS 5,625,656 A * 4/1997 Hettiarachchi ........ G21C 19/30
                                                              422/11
8,781,058 B1 * 7/2014 Wen ...................... G21C 17/022
                                                              376/277

FOREIGN PATENT DOCUMENTS

CN    111681791    9/2020
CN    115410730    11/2022
(Continued)

OTHER PUBLICATIONS

International Search Report a for corresponding International Patent Application No. PCT/CN2023/077865, dated Jun. 21, 2023.
(Continued)

*Primary Examiner* — Christopher E Mahoney
(74) *Attorney, Agent, or Firm* — Michael Fedrick; LOZA & LOZA, LLP (57) ABSTRACT

The disclosure relates to the field of nuclear power energy technology, and specifically relates to a screening method for an optimal zinc ion concentration in the primary loop during the hot functional test of a nuclear power plant. Unlike the study of zinc injection in primary loop during pre-critical and power operation of a nuclear power plant, the disclosure is directed to the study of optimal zinc
(Continued)

injection concentration during the hot functional test. Specifically, in the disclosure, a hot functional test environment is simulated by an autoclave, and the optimal zinc ion concentration range is identified by impedance experiments on test specimens with film formation in the autoclave. The method is highly representative of tests, with clear data trends, high experimental visibility and evaluability, which provides a screening method for the optimal zinc ion concentration in the primary loop during the hot functional test of a nuclear power plant.

15 Claims, 3 Drawing Sheets (51) Int. Cl.
G01N 1/32 (2006.01)
G01N 1/34 (2006.01)
G01N 17/00 (2006.01)
G01N 23/2251 (2018.01)

(52) U.S. Cl.
CPC ........ *G01N 17/002* (2013.01); *G01N 23/2251* (2013.01); *G01N 2001/2866* (2013.01)

(58) Field of Classification Search
CPC ........ G01N 1/28; G01N 17/006; G01N 27/26; Y02E 30/30
See application file for complete search history.

(56) References Cited

FOREIGN PATENT DOCUMENTS

JP 2015200591 11/2015
WO 2022128968 6/2022

OTHER PUBLICATIONS

Iva Betova et al. "Influence of Zn on the oxide layer on AISI 316L(NG) stainless steel in simulated pressurised water reactor coolant", Electrochimica Acta, Aug. 30, 2008.

Energy Industry Standards of the People's Republic of China, "Guidelines for zinc addition in primary coolant of pressurized water reactors," Dec. 28, 2023.

* cited by examiner

METHOD FOR SCREENING THE OPTIMAL ZINC ION CONCENTRATION OF A PRIMARY LOOP DURING A THERMAL STATE FUNCTION TEST OF A NUCLEAR POWER PLANT

TECHNICAL FIELD

The present disclosure relates to the field of nuclear power energy technology, and specifically relates to a screening method for an optimal zinc ion concentration in primary loop during the hot functional test of a nuclear power plant.

BACKGROUND ART

Under the high temperature and high pressure water environment of pressurized water reactor (PWR) nuclear power plants, the corrosion of the materials of the primary loop equipment is the main problem that threatens the safe operation of the nuclear power plants, and is also the main reason for the shutdown of the reactor. Specifically, since the material used in the main equipment of primary loop is predominantly 316 austenitic stainless steel, when it is exposed to coolant at high temperature and high pressure, a double layer of oxidized film is formed, where the inner layer of the double layer of oxidized film is a dense, protective oxidized film, and the outer layer of the double layer of oxidized film is corrosion product. During the operation of a nuclear power plant, the corrosion products of the outer layer are first transferred to the core with the coolant, and under the irradiation of neutrons, activated corrosion products such as radioactive $Co^{58}$ and $Co^{60}$ are generated. Subsequently, the activated corrosion products will be transferred to out of the core with the coolant and bonded on the inner surface of the primary loop under certain water-chemical conditions.

In order to reduce the outage dose rate and reduce stress corrosion cracking, zinc injection technology was developed. The principle is that after adding zinc ions to the coolant of primary loop, on the one hand, the zinc ions can replace the radionuclides in the oxide film, such that these ions are released into the coolant and continuously purified in the coolant; on the other hand, the zinc ions can also occupy the inter-crystalline position of the released metal ions, such that the oxide film is denser, which in turn prevents $Co^{58}$ and $Co^{60}$ from entering the oxide film that would cause a high radiated field in the primary loop.

Currently, the vast majority of pressurized water reactors implementing zinc injection technology are mature plants where, due to continuous plant operation, existing oxide films have formed and become established on the surface of the primary loop equipment, and where zinc injection under these conditions can cause additional release of dissolved corrosion products into the coolant, which, through the coolant cycle, can be deposited on the fuel casing, resulting in fouling-induced localized corrosion and fouling-induced core power excursions. For this reason, the concentration of zinc ions during zinc injection in loaded nuclear power plants is usually controlled between 2 ppb and 15 ppb.

Zinc injection from the hot functional test (HFT) period began for the first time in 2008 at Tomari 3, Hokkaido Electric Power Company, Japan, at a zinc ion concentration in the range of 1 ppb to 5 ppb. After one fuel cycle, corrosion products at Tomari 3 were compared to those at the reference plant Tomari 1 over the same period, with corrosion products reduced by 75%, and the average dose rate for the reactor head cap and the main pipeline was reduced by 40% to 60%. Seen as such, starting zinc injection from the time before loading of the plant, i.e., during the hot functional test, was much more effective in mitigating the corrosion of the equipment and in reducing the dose rate of the shutdown reactor. However, due to the low zinc injection concentration at Tomari 3, and theoretically speaking, during the hot functional test, the nuclear power plant has not yet been officially operated, that is, no existing oxide film has been formed. So, when considering the zinc injection concentration, the range is generally larger, for example, the concentration of zinc ions specified in China's "Guidelines for Adding Zinc to the Primary loop Coolant of Pressurized Water Reactor Nuclear Power Plants" is between 20 ppb and 100 ppb. Therefore, the zinc injection concentration at Tomari 3 cannot provide the optimal zinc ion concentration range during the hot functional testing.

At present, most of the second-generation nuclear power units that have been completed and put into operation in China are reactor types imported from abroad. Due to the reasons such as differences in reactor types, equipment suppliers and construction units, the completed nuclear power units cannot be exactly the same in terms of equipment selection, welding processes, and welding materials. Therefore, it is difficult to quickly adjust and implement the water chemistry control technology of zinc injection in the primary loop to reduce the radiation field. Domestic technical research on zinc injection in the primary loop of nuclear power plants is mainly aimed at the daily operation of nuclear power plants. Research on zinc injection technology in the primary loop during the hot functional tests has not yet been carried out.

For these reasons, it is necessary to carry out a study on the screening method of the optimal zinc ion concentration in the primary loop during the hot functional test.

SUMMARY OF THE INVENTION

The present disclosure primarily addresses the technical problem of providing a screening method for an optimal zinc ion concentration in the primary loop during a hot functional test of a nuclear power plant, and providing a range of optimal zinc ion concentrations in primary loop during the hot functional test of a nuclear power plant on basis of the method.

In order to solve the above technical problem, the present disclosure provides a screening method for an optimal zinc ion concentration in the primary loop during a hot functional test of a nuclear power plant, including the steps of maintaining an autoclave (a high-temperature and high-pressure reaction kettle) containing a test specimen in a hot functional test environment; adding a zinc salt to the autoclave until the zinc ion concentration is in a range of 20 ppb to 250 ppb, and performing a film-forming test; upon completion of the film-forming test, taking out the test specimen, performing an electrochemical impedance test on the test specimen, plotting an electrochemical impedance trend chart of the test specimen over different zinc ion concentrations based on the electrochemical impedance test results, and screening the zinc ion concentration range corresponding to impedance values less than $1.085*10^5$ ohm based on the electrochemical impedance trend chart.

Based on the experience of zinc injection at Tomari 3, Japan, it can be found that starting zinc injection from the time before loading, i.e., during the hot functional test of a nuclear power plant, is more effective in slowing down the corrosion of the equipment and reducing the dose rate of the outage. Therefore, it is very necessary for new nuclear power plants to perform good pre-coating on the inner surface of the primary loop equipment through zinc injection during the hot functional test. However, at present, research on related technologies for zinc injection in the primary loop of nuclear power plants mostly stays at the pre-critical and power operation stages of nuclear power plants. There is an urgent need to study the zinc concentration range and methods during the hot functional test.

The present disclosure mainly conducts research on the optimal zinc ion concentration of primary loop during the hot functional test. Specifically, in the present disclosure, an autoclave is used to simulate the hot functional test environment of a nuclear power plant. This test method is simple, fast, highly representative, and highly operable. It can truly reflect the film formation of the test specimen in the hot functional test environment, and provides a test screening method for an optimal zinc ion concentration in the primary loop during a hot functional test of a nuclear power plant.

In addition, in the present disclosure, a zinc ion concentration range with lower impedance values is selected by performing an electrochemical impedance test on the test specimen after film formation and plotting the electrochemical impedance of the test specimen over different zinc ion concentrations based on the results of the electrochemical impedance tests. As a principle, the lower the impedance value is, the lower the corrosion resistance is, which means that the zinc ions can be better combined in the test specimen on the oxide film, thereby reducing the shutdown dose rate and reducing stress corrosion cracking. The present disclosure provides for determination of zinc ion concentration range by means of electrochemical impedance plot, with clear data trends, visibility and evaluability.

Further, the test specimen is electrically welded with a wire, and the wire is made of nickel, silver, copper or aluminum.

In the present disclosure, a wire is electrically welded to the test specimen. When the impedance test is conducted, the electrode clip is connected to one end of the wire, which avoids the occurrence of inaccurate test area and test results caused by the direct contact of the electrode clip with a buffer solution, thus accuracy of impedance test data is high.

Further, before performing the electrochemical impedance test on the test specimen, the screening method further includes sealing and insulating the wire.

In the present disclosure, in order to further avoid occurrence of inaccurate test area and test results caused by the direct contact of the wire with the buffer solution, the wire is sealed and insulated.

Further, the sealing and insulating the wire includes: sealing the wire by heat shrink tubing, and sealing the joint between the test specimen and the wire with a sealant.

In the present disclosure, in order to further ensure accuracy of the test results, the test specimen is sealed and insulated at the point where it is connected to the wire. Specifically, in the present disclosure, a sealant and heat shrink tubing is used to seal the test specimen at its joint to the wire and the wire other than a portion of the wire used to connect the electrode clip, respectively, which is simple and convenient to operate.

Further, the zinc salt is zinc acetate.

In the present disclosure, by adding zinc acetate, a denser zinc oxide film can be formed on the surface of the test specimen, and at the same time, other decomposition products of zinc acetate have less influence on the test specimen, so the test results are more accurate.

Further, parameters for the hot functional test environment include: a temperature of 290° C. to 300° C. and a pressure of 15 MPa to 16 MPa.

Further, the autoclave contains lithium ions at a concentration of 0.3 ppm to 0.8 ppm.

Further, the lithium ions are provided by lithium hydroxide.

In the present disclosure, the pH of the system is adjusted by means of lithium hydroxide to maintain the test specimen in a more alkaline hot functional test environment.

Further, the autoclave contains hydrogen at a concentration of 2.2 ppm to 3.1 ppm.

Further, an oxygen content in the autoclave is less than 100 ppb.

Further, before maintaining an autoclave containing a test specimen in a hot functional test environment, the screening method further includes: suspending the test specimen in the autoclave that is connected to a platform for corrosion testing in moving water, to obtain the autoclave containing the test specimen.

Further, the maintaining an autoclave containing a test specimen in a hot functional test environment includes: providing a flake specimen; grinding and polishing the six surfaces of the flake specimen to obtain a ground and polished flake specimen; ultrasonically cleaning the ground and polished flake specimen sequentially with acetone and ultrapure water to remove surface dirt from the ground and polished flake specimen to obtain the test specimen.

Further, after the screening the zinc ion concentration range corresponding to impedance values less than $1.085*10^5$ ohm based on the electrochemical impedance trend chart, the screening method further includes: determining a target zinc ion concentration within the zinc ion concentration range corresponding to impedance values less than $1.085*10^5$ ohm.

Further, the determining a target zinc ion concentration within the zinc ion concentration range corresponding to impedance values less than $1.085*10^5$ ohm includes: uniformly selecting a plurality of zinc ion concentrations from the zinc ion concentration range corresponding to impedance values less than $1.085*10^5$ ohm; maintaining the autoclave containing the test specimen in a hot functional test environment; adding a zinc salt to the autoclave until the zinc ion concentration is the selected zinc ion concentration, and performing a film-forming test; upon completion of the film-forming test, removing the test specimen, performing a corrosion weight gain test on the test specimen, and plotting a corrosion weight gain trend chart of the test specimen over a plurality of zinc ion concentrations; performing a scanning electron microscope test and carrying out a morphology and energy spectrum analysis of the test specimen, to obtain surface scanning electron microscope images of the test specimen for the plurality of zinc ion concentrations, and plotting a zinc content trend chart of the test specimen over the plurality of zinc ion concentrations; determining the target zinc ion concentration based on the corrosion weight gain trend chart, the surface scanning electron microscope images and the zinc content trend chart of test specimens for the plurality of zinc ion concentrations.

Further, the selected plurality of zinc ion concentrations includes at least a minimum zinc ion concentration, a maximum zinc ion concentration, and an intermediate zinc ion concentration between the minimum zinc ion concentration and the maximum zinc ion concentration, in the zinc ion concentration range corresponding to impedance values of less than $1.085*10^5$ ohm.

In the present disclosure, nitrogen is used to purge the autoclave to reduce the oxygen content in the autoclave. On one hand, the method can prevent the oxidation of the test specimen from affecting the results of the impedance test. On the other hand, it can also effectively prevent test safety risks caused by the mixing of hydrogen and oxygen in the autoclave.

Therefore, the present disclosure has at least the following beneficial effects:

(1) The present disclosure is different from the study of the zinc ion concentration control range of the primary loop during pre-critical and power operation of a nuclear power plant. Instead, it studies the zinc injection range during the hot functional test, and provides a screening method for an optimal zinc ion concentration in the primary loop during a hot functional test of a nuclear power plant, along with the optimal zinc ion concentration range obtained under experimental conditions.

(2) In the present disclosure, electrochemical impedance tests are conducted on test specimens with film formation at different zinc ion concentrations, and the optimal zinc ion concentration range is screened based on the results of the tests, with obvious data trends, and high visibility and evaluability.

DESCRIPTION OF DRAWINGS

In order to illustrate the embodiments of the present disclosure more clearly, the accompanying drawings will be briefly introduced below.

DETAILED DESCRIPTION

The present disclosure will be further described below in conjunction with the accompanying drawings and specific embodiments. Those of ordinary skill in the art will be able to implement the present disclosure based on these descriptions. In addition, the embodiments of the present disclosure mentioned in the following description are generally only some embodiments of the present disclosure, rather than all the embodiments. Therefore, based on the embodiments in the present disclosure, all other embodiments obtained by those of ordinary skill in the art without creative efforts should fall within the protection scope of the present disclosure.

Figure 1:
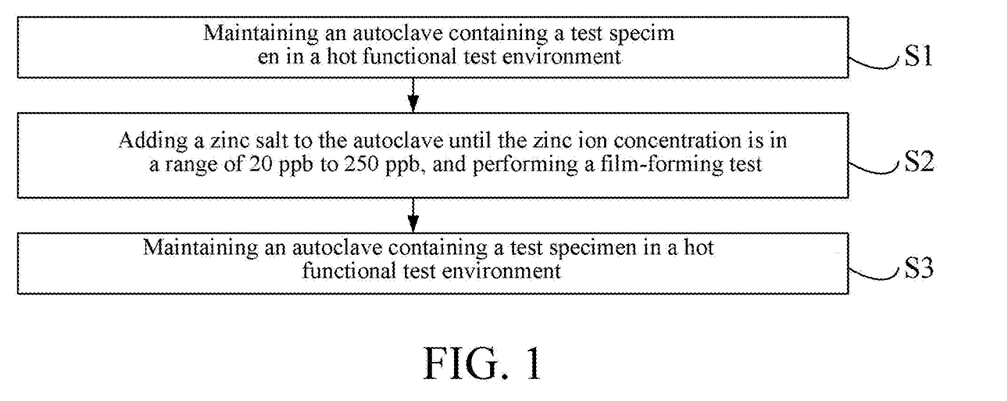
FIG. 1 shows a schematic flow chart of a screening method for an optimal zinc ion concentration in the primary loop during a hot functional test of a nuclear power plant provided by an example of the present disclosure.

FIG. 1 shows a schematic flow chart of a screening method for an optimal zinc ion concentration in the primary loop during a hot functional test of a nuclear power plant provided by an example of the present disclosure. As shown in FIG. 1, the screening method includes the steps of:

S1: maintaining an autoclave containing a test specimen in a hot functional test environment;

S2: adding a zinc salt to the autoclave until the zinc ion concentration is in a range of 20 ppb to 250 ppb, and performing a film-forming test;

S3: upon completion of the film-forming test, taking out the test specimen, performing an electrochemical impedance test on the test specimen, plotting an electrochemical impedance trend chart of the test specimen over different zinc ion concentrations based on the electrochemical impedance test results, and screening the zinc ion concentration range corresponding to impedance values less than $1.085*10^5$ ohm based on the electrochemical impedance trend chart.

It should be noted that the materials used in the test specimens are the same as those used in the main equipment of the primary loop, including but not limited to, 316 austenitic stainless steel, Inconel 690 or 304 austenitic stainless steel.

Therefore, the examples of the present disclosure had at least the following beneficial effects: (1) The examples of the present disclosure were different from the study of the zinc ion concentration control range of the primary loop during pre-critical and power operation of a nuclear power plant. Instead, they studied the zinc injection range during the hot functional test, and provided a screening method for an optimal zinc ion concentration in the primary loop during a hot functional test of a nuclear power plant, along with the optimal zinc ion concentration range obtained under experimental conditions. (2) In the examples of the present disclosure, electrochemical impedance tests were conducted on test specimens with film formation at different zinc ion concentrations, and the optimal zinc ion concentration range was screened based on the results of the tests, with obvious data trends, and high visibility and evaluability.

Hereafter, by an example of the material used in the test specimen as 316 austenitic stainless steel, the screening method for an optimal zinc ion concentration in the primary loop during a hot functional test of a nuclear power plant is illustrated with specific examples.

Example 1

The screening method for an optimal zinc ion concentration in the primary loop during a hot functional test of a nuclear power plant includes: Preparation of test specimens. The 316 austenitic stainless steel material was processed into a flake sample with a size of 10*10*3 mm, and then the six end faces of the flake sample were ground on a polishing machine in sequence with sandpapers of No. 180, No. 400, No. 800, No. 1200, and No. 2000. After grinding, the sample was polished using alumina polishing powder until there were no obvious scratches. In this example, considering that nickel wire has a low melting point, is easy to electro-weld and is cost-effective, nickel wire was used as a conductor wire, and specifically, nickel wire with a length of about 10 cm was electro-welded to the side of the specimen to obtain a test specimen.

It should be noted that the six end surfaces of the flake specimen can be ground on the grinding machine to a target size of sandpaper (e.g., No. 2000), and the sandpaper used sequentially during the grinding period can be adjusted according to actual needs.

Preparations before the test. The test specimen was ultrasonically cleaned with acetone and ultrapure water in sequence to remove surface dirt. In this example, in order to accelerate the drying of the test specimen, the test specimen was placed in a drying oven for 2 hours. After the drying was completed, the test specimen to be tested was suspended in the autoclave of the platform for corrosion testing in moving water, and the platform for corrosion testing in moving water was pass-through connected to the autoclave.

Film-forming test. About 80 L of high-purity water was injected into the platform for corrosion testing in moving water, and the system pressure was increased to 15 Mpa and the temperature was at 290° C. In this example, nitrogen purging was used to reduce the oxygen content in the platform for corrosion testing in moving water to less than 100 ppb to prevent oxidation of the test specimen. Hydrogen purging was used to increase the hydrogen content in the platform for corrosion testing in moving water to approximately 2.2 ppm. Lithium hydroxide was added to make the lithium ion concentration in the platform for corrosion testing in moving water reach approximately 0.3 ppm. Within 48 hours after the autoclave reached the above indicators, the zinc ion concentration in the autoclave was adjusted such that the zinc ion concentration reached 56.9 ppb and was stable, and then the passivation of the film-forming timer was carried out for 48 hours. After that, the temperature and pressure of the autoclave were lowered to normal temperature and pressure, the water in the autoclave was discharged, the test specimen was taken out and then subjected to the impedance test.

It should be noted that the six end surfaces of the flake specimen can be ground on the grinding machine to a target size of sandpaper (e.g., No. 2000), and the sandpaper used sequentially during the grinding period can be adjusted according to actual needs. Within 48 hours after the autoclave reached the above indicators.

Electrochemical impedance test. In this example, 0.15 mol/L $H_3BO_3$ and 0.0375 mol/L $Na_2B_4O_7 \cdot 10H_2O$ were used as the buffer solution for the electrochemical impedance test. In order to prevent the nickel wire from affecting the test, a heat shrink tubing was used to seal the nickel wire on the test specimen, and sealant was used to seal the joint between the test specimen and the nickel wire to ensure sealing and insulation. In order to reduce the influence of air on the results, the buffer solution was purged with nitrogen for 30 minutes before the electrochemical impedance test. Using the test specimen as the working electrode, an Ag electrode as the reference electrode, and a platinum sheet as the auxiliary electrode, the electrochemical impedance test was conducted in a five-necked flask in a constant temperature water bath at the open circuit potential of the oxide film. The amplitude of the sinusoidal signal constituting the AC disturbance in the electrochemical impedance test was set to 0.01V, and the frequency was $10^{-5}$ Hz to $10^{-2}$ Hz.

Example 2

This Example was basically the same as Example 1, except that the zinc ion concentration was 73 ppb.

Example 3

This Example was basically the same as Example 1, except that the zinc ion concentration was 106.9 ppb.

Example 4

This Example was basically the same as Example 1, except that the zinc ion concentration was 128.6 ppb.

Example 5

This Example was basically the same as Example 1, except that the zinc ion concentration was 155 ppb.

Example 6

This Example was basically the same as Example 1, except that, during the film-forming test, the pressure in the autoclave was 16 Mpa, the temperature was 300° C., the hydrogen content was about 3.1 ppm, the lithium ion concentration was about 0.8 ppm, and the zinc ion concentration was 73 ppb.

Example 7

This Example was basically the same as Example 1, except that, during the film-forming test, the pressure in the autoclave was 15 Mpa, the temperature was 290° C., the hydrogen content was about 2.2 ppm, the lithium ion concentration was about 0.3 ppm, and the zinc ion concentration was 73 ppb.

Comparative Example 1

This Example was basically the same as Example 1, except that the zinc ion concentration was 25.8 ppb.

Comparative Example 2

This Example was basically the same as Example 1, except that the zinc ion concentration was 183.2 ppb.

Comparative Example 3

This Example was basically the same as Example 1, except that the zinc ion concentration was 206.9 ppb.

Comparative Example 4

This Example was basically the same as Example 1, except that the zinc ion concentration was 249.6 ppb.

Figure 2:
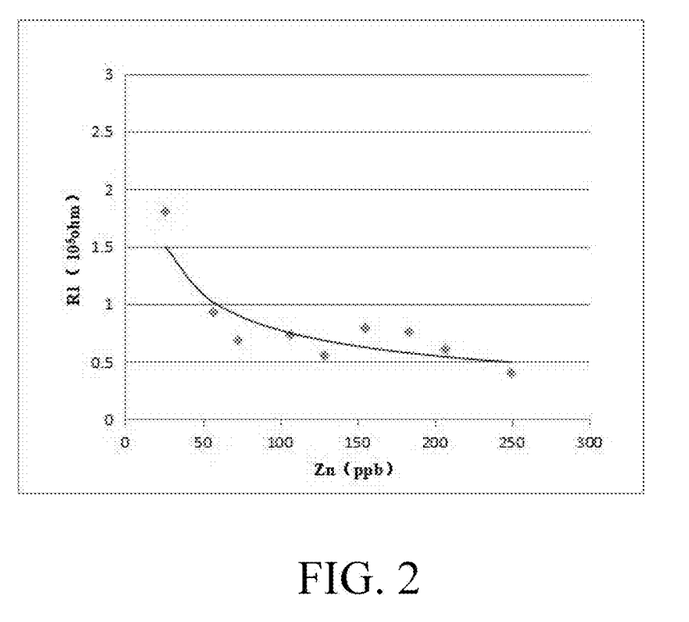
FIG. 2 shows an electrochemical impedance plot of a test specimen using 316 austenitic stainless steel for different zinc ion concentrations provided by an example of the present disclosure.

Combining the above-mentioned Examples 1 to 7 and Comparative Examples 1 to 4, the electrochemical impedance trend chart of the test specimen using 316 austenitic stainless steel material for different zinc ion concentrations can be drawn as shown in FIG. 2. By observing FIG. 2, it can be seen that:

(1) As the concentration of zinc ions in the autoclave continued to increase, the resistance value of the 316 austenitic stainless steel material continued to decrease, which meant that the corrosion resistance of the 316 austenitic stainless steel material was lower, at this time, zinc ions can be better combined with the oxide film of the test specimen, making the oxide film denser.

(2) When the impedance of 316 austenitic stainless steel material was $1.085*10^5$ ohm, its zinc ion concentration was about 50 ppb. When the zinc ion concentration was less than this value, the impedance value decreased significantly as the zinc ion concentration increased.

(3) When the zinc ion concentration was between 50 ppb and 100 ppb, the impedance trend graph gradually slowed down.

(4) When the zinc ion concentration was between 50 ppb and 200 ppb, the actual impedance values of the examples and comparative examples were not much different, and they were both between $0.5*10^5$ ohm and $1*10^5$ ohm.

(5) When the zinc ion concentration was between 100 ppb and 250 ppb, the impedance trend graph slowed down significantly, that is, to reduce the impedance value of the same magnitude, an increasing amount of zinc ions need to be consumed.

(6) In summary, the optimal zinc ion concentration range was 50 ppb or more. For example, the zinc ion concentration range can be selected from 50 ppb to 150 ppb. For another example, considering the economy of primary loop pre-filming during the hot functional test, the optimal zinc ion concentration range for primary loop during the hot functional test of a nuclear power plant is approximately 75 ppb to 125 ppb.

Referring to the analysis results of the above-mentioned Examples 1 to 7, it can be seen that the examples of the present disclosure also have at least the following beneficial effects: (3) The method provided by the present disclosure includes material preparation, material processing, test equipment conditions, test parameters, screening methods, optimal zinc ion concentration range, and the like, and the test method is highly systematic, tightly connected, and highly operable. (4) The present disclosure provides the preparation and processing process of the test specimen, and the process is simple and fast, can truly reflect the true surface state of the primary loop metal material, and the test is highly representative.

After completing the determination of the optimal zinc ion concentration range, the screening method for an optimal zinc ion concentration in the primary loop during a hot functional test of a nuclear power plant can further include: determining a target zinc ion concentration within the zinc ion concentration range corresponding to impedance values less than $1.085*10^5$ ohm.

In some examples, said determining a target zinc ion concentration within the zinc ion concentration range corresponding to impedance values less than $1.085*10^5$ ohm includes: uniformly selecting a plurality of zinc ion concentrations from the zinc ion concentration range corresponding to impedance values less than $1.085*10^5$ ohm; maintaining the autoclave containing the test specimen in a hot functional test environment; adding a zinc salt to the autoclave until the zinc ion concentration is the selected zinc ion concentration, and performing a film-forming test; upon completion of the film-forming test, removing the test specimen, performing a corrosion weight gain test on the test specimen, and plotting a corrosion weight gain trend chart of the test specimen over a plurality of zinc ion concentrations; performing a scanning electron microscope test and carrying out a morphology and energy spectrum analysis of the test specimen, to obtain surface scanning electron microscope images of the test specimen for the plurality of zinc ion concentrations, and plotting a zinc content trend chart of the test specimen over the plurality of zinc ion concentrations; determining the target zinc ion concentration based on the corrosion weight gain trend chart, the surface scanning electron microscope images and the zinc content trend chart of test specimens for the plurality of zinc ion concentrations.

Hereafter, the process of determining the target zinc ion concentration is exemplarily illustrated in conjunction with Example 8. According to the above-determined optimal zinc ion concentration range was 75-125 ppb, 75 ppb, 100 ppb and 125 ppb were selected for the target zinc ion concentration determination test.

Example 8

A new test specimen was remade according to the preparation of the test specimen in Example 1 above. The film-forming test in Example 1 above was repeated several times, except that within 48 hours after the autoclave had reached the above index, the zinc ion concentration in the autoclave was adjusted such that the zinc ion concentration reached 75 ppb and was stable. After 336 hours from the start of passivation film formation, the temperature and pressure of the autoclave were then lowered to normal temperature and pressure, the water in the autoclave was discharged, the test specimens were taken out and then subjected to a corrosion weight gain test and a scanning electron microscopy test. The corrosion weight gain results of the test specimen can be obtained from the corrosion weight gain test. The surface scanning electron microscope images and the zinc content of the test specimen can be obtained from the scanning electron microscope test.

Example 9

This Example was basically the same as Example 8, except that the zinc ion concentration was 100 ppb.

Example 10

This Example was basically the same as Example 8, except that the zinc ion concentration was 125 ppb.

Figure 3:
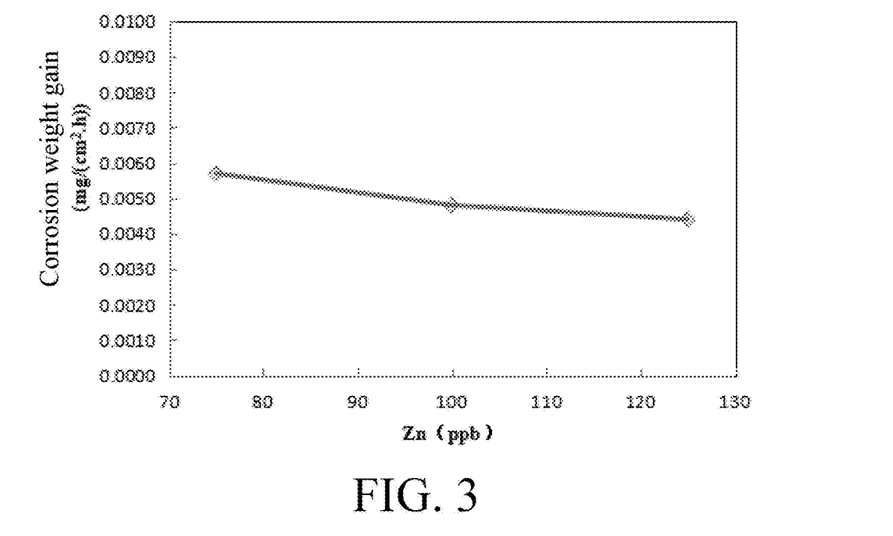
FIG. 3 shows a corrosion weight gain plot of a test specimen using 316 austenitic stainless steel for different zinc ion concentrations provided by an example of the present disclosure.
Figure 4:
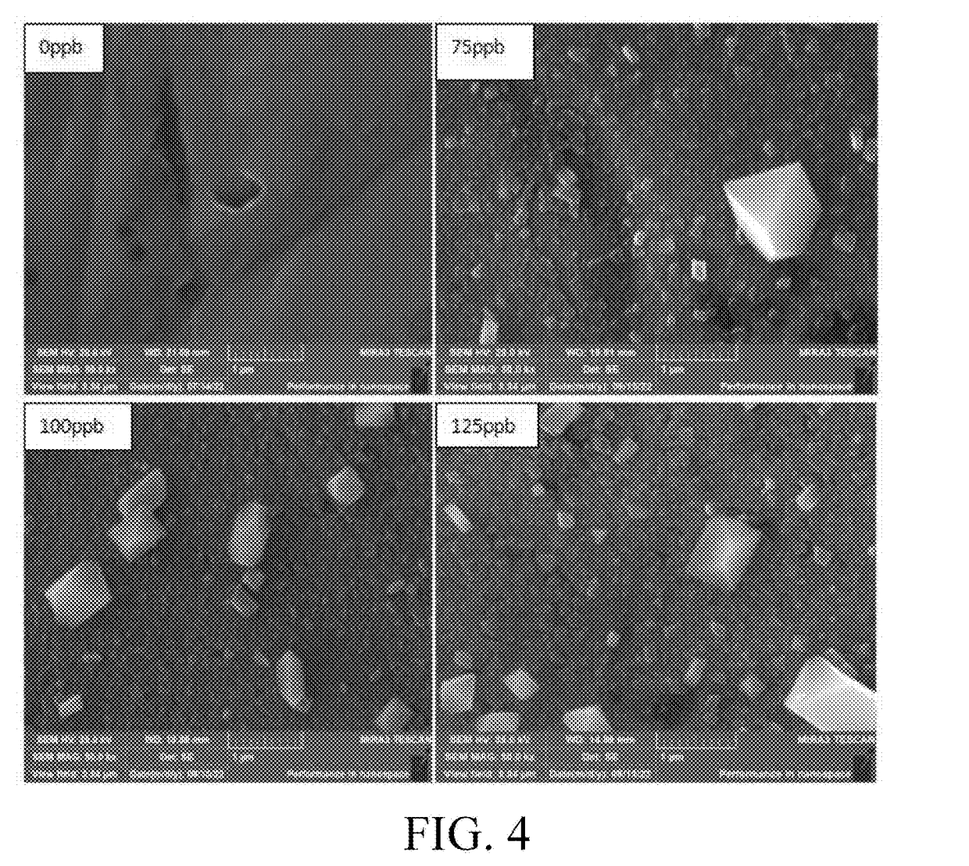
FIG. 4 shows surface scanning electron microscope images of a test specimen using 316 austenitic stainless steel for different zinc ion concentrations provided by an example of the present disclosure.
Figure 5:
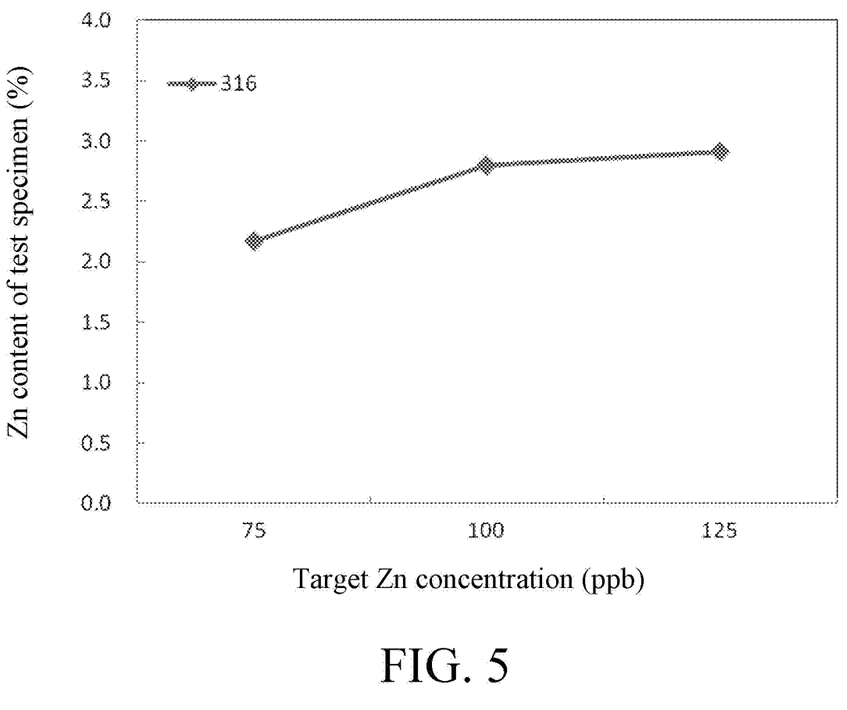
FIG. 5 shows a zinc content change plot of a test specimen using 316 austenitic stainless steel for different zinc ion concentrations provided by an example of the present disclosure.

Referring to the above Examples 8 to 10, the corrosion weight gain trend chart of the test specimen using 316 austenitic stainless steel material for different zinc ion concentrations can be drawn as shown in FIG. 3, the zinc content trend chart of the test specimen using 316 austenitic stainless steel material for different zinc ion concentrations can be draw as shown in FIG. 5, and surface scanning electron microscope images of test specimens using 316 austenitic stainless steel materials for different zinc ion concentrations can be obtained as shown in FIG. 4. Referring to FIG. 3, it can be seen that the corrosion weight gain trend was relatively stable when the zinc ion concentration was 100 ppb and 125 ppb. The massive particles in FIG. 4 are zinc. Referring to FIG. 4, it can be seen that the densification of the test specimen surface at zinc ion concentrations of 100 ppb and 125 ppb was higher than that of the test specimen surface at a zinc ion concentration of 75 ppb. There was little difference in the densification of the test specimen surfaces at zinc ion concentrations of 100 ppb and 125 ppb. Referring to FIG. 5, it can be seen that the zinc content of the test specimen did not change significantly when the zinc ion concentration was 100 ppb and 125 ppb. Considering economy, the target zinc ion concentration can be determined to be 100 ppb.

Combining the analysis results of the above-mentioned Examples 8 to 10, it can be seen that the examples of the present disclosure also have at least the following beneficial effects: (5) Examples of the present disclosure further provided that on basis of determining a range of optimal zinc ion concentrations, a corrosion weight gain test and a scanning electron microscopy test on test specimens with film formation at different zinc ion concentrations were carried out, and a target zinc ion concentration was screened based on the test results of the corrosion weight gain test and the scanning electron microscopy test.

It should be noted that in all the above examples, test parameters such as the passivation film formation timing and the nitrogen flow time can be set according to actual needs. For example, the passivation film formation timing in the above Example 8 was set to 336 hours according to actual needs. In other similar examples, the passivation film formation timing may also be set to other time lengths with an error within 10% of 336 hours.

Finally, the above-described examples are only descriptions of preferred embodiments of the present disclosure and do not limit the scope of the present disclosure. Without departing from the design spirit of this disclosure, all modifications that those of ordinary skill in the art can directly derive or associate from the contents disclosed in this disclosure should be considered to be within the protection scope of this disclosure.

The invention claimed is:

1. A screening method for an optimal zinc ion concentration in the primary loop during a hot functional test of a nuclear power plant, wherein the method includes the steps of:
   maintaining an autoclave containing a test specimen in a hot functional test environment;
   adding a zinc salt to the autoclave until the zinc ion concentration is in a range of 20 ppb to 250 ppb, and performing a film-forming test;
   upon completion of the film-forming test, taking out the test specimen, performing an electrochemical impedance test on the test specimen, plotting an electrochemical impedance trend chart of the test specimen over different zinc ion concentrations based on the electrochemical impedance test results, and screening the zinc ion concentration range corresponding to impedance values less than $1.085*10^5$ ohm based on the electrochemical impedance trend chart.

2. The screening method according to claim 1, wherein the test specimen is electrically welded with a wire, and the wire is made of nickel, silver, copper or aluminum.

3. The screening method according to claim 2, before the performing an electrochemical impedance test on the test specimen, the method further comprising:
   sealing and insulating the wire.

4. The screening method according to claim 3, wherein the sealing and insulating the wire comprises:
   sealing the wire by heat shrink tubing, and sealing the joint between the test specimen and the wire with a sealant.

5. The screening method according to claim 1, wherein the zinc salt is zinc acetate.

6. The screening method according to claim 1, wherein parameters for the hot functional test environment include: a temperature of 290° C. to 300° C. and a pressure of 15 MPa to 16 MPa.

7. The screening method according to claim 1, wherein the autoclave contains lithium ions at a concentration of 0.3 ppm to 0.8 ppm.

8. The screening method according to claim 7, wherein the lithium ions are provided by lithium hydroxide.

9. The screening method according to claim 1, wherein the autoclave contains hydrogen at a concentration of 2.2 ppm to 3.1 ppm.

10. The screening method according to claim 1, wherein the oxygen content in the autoclave is less than 100 ppb.

11. The screening method according to claim 1, wherein before maintaining an autoclave containing a test specimen in a hot functional test environment, the method further comprises:
    suspending the test specimen in the autoclave that is connected to a platform for corrosion testing in moving water, to obtain the autoclave containing the test specimen.

12. The screening method according to claim 1, wherein the maintaining an autoclave containing a test specimen in a hot functional test environment comprises:
    providing a flake specimen;
    grinding and polishing the six surfaces of the flake specimen to obtain a ground and polished flake specimen;
    ultrasonically cleaning the ground and polished flake specimen sequentially with acetone and ultrapure water to remove surface dirt from the ground and polished flake specimen to obtain the test specimen.

13. The screening method according to claim 1, wherein after the screening the zinc ion concentration range corresponding to impedance values less than $1.085*10^5$ ohm based on the electrochemical impedance trend chart, the method further comprises:
    determining a target zinc ion concentration within the zinc ion concentration range corresponding to impedance values less than $1.085*10^5$ ohm.

14. The screening method according to claim 13, wherein the determining a target zinc ion concentration within the zinc ion concentration range corresponding to impedance values less than $1.085*10^5$ ohm comprises:
    uniformly selecting a plurality of zinc ion concentrations from the zinc ion concentration range corresponding to impedance values less than $1.085*10^5$ ohm;
    maintaining the autoclave containing the test specimen in a hot functional test environment;
    adding a zinc salt to the autoclave until the zinc ion concentration is the selected zinc ion concentration, and performing a film-forming test;
    upon completion of the film-forming test, removing the test specimen, performing a corrosion weight gain test on the test specimen, and plotting a corrosion weight gain trend chart of the test specimen over a plurality of zinc ion concentrations;
    performing a scanning electron microscope test and carrying out a morphology and energy spectrum analysis of the test specimen, to obtain surface scanning electron microscope images of the test specimen for the plurality of zinc ion concentrations, and plotting a zinc content trend chart of the test specimen over the plurality of zinc ion concentrations;
    determining the target zinc ion concentration based on the corrosion weight gain trend chart, the surface scanning electron microscope images and the zinc content trend chart of test specimens for the plurality of zinc ion concentrations.

15. The screening method according to claim 14, wherein the selected plurality of zinc ion concentrations comprises at least a minimum zinc ion concentration, a maximum zinc ion concentration, and an intermediate zinc ion concentration between the minimum zinc ion concentration and the maximum zinc ion concentration, in the zinc ion concentration range corresponding to impedance values less than $1.085*10^5$ ohm.

* * * * *